Dec. 31, 1929.       J. EDGAR       1,741,759

METHOD OF AND MACHINE FOR RELIEVING CUTTERS

Filed May 4, 1927        6 Sheets-Sheet 3

INVENTOR
John Edgar
BY
Christabel Parker & Carlson
ATTORNEYS

Dec. 31, 1929.  J. EDGAR  1,741,759
METHOD OF AND MACHINE FOR RELIEVING CUTTERS
Filed May 4, 1927  6 Sheets-Sheet 5

INVENTOR
John Edgar
BY
ATTORNEYS

Dec. 31, 1929.                J. EDGAR                  1,741,759
              METHOD OF AND MACHINE FOR RELIEVING CUTTERS
                    Filed May 4, 1927          6 Sheets-Sheet 6

INVENTOR
John Edgar
BY
Chindall Parker & Carlson
ATTORNEYS

Patented Dec. 31, 1929

1,741,759

UNITED STATES PATENT OFFICE

JOHN EDGAR, OF ROCKFORD, ILLINOIS, ASSIGNOR TO BARBER-COLMAN COMPANY, OF ROCKFORD, ILLINOIS, A CORPORATION OF ILLINOIS

METHOD OF AND MACHINE FOR RELIEVING CUTTERS

Application filed May 4, 1927. Serial No. 188,844.

The present invention relates generally to an improved method of and machine for forming and relieving hobs.

An important object of the present invention resides in the provision of a novel method and a machine for carrying out said method, by which hobs can be threaded and relieved in a single operation.

Another object is to provide a machine of the above character which will relieve the teeth of the hob in such a manner that the teeth can be repeatedly resharpened without losing their form.

A further object of the invention is to provide a machine which is automatic in operation, which is relatively simple and inexpensive in construction, and which is adjustable to adapt it to hobs of different forms and sizes.

A specific object of the invention resides in the provision of a method of forming and relieving hobs, which method comprises gashing a hob blank longitudinally, rotating the blank, feeding a lathe tool of the desired contour in timed relation to the rotation of the blank and parallel to the axis of the blank in a cutting stroke to generate the desired thread helix, reciprocating the lathe tool laterally of the blank and in timed relation to the rotation of the blank during the cutting stroke to back-off or relieve the teeth, withdrawing the lathe tool from the blank at the end of the traverse, reversing the rotation of the blank and the feed of the lathe tool to return them in a free return stroke to their relative initial positions, returning the lathe tool into cutting engagement with the blank, and repeating the foregoing cycle with an incremental feed of the lathe tool into the blank for each succeeding cycle until the hob is completed.

Other objects reside in the provision of novel means for reciprocating the lathe tool, novel means for bringing the lathe tool into and out of cutting engagement, and novel means for automatically controlling the machine movements.

Further objects and advantages will become apparent as the description proceeds. In the accompanying drawings, wherein I have illustrated a preferred embodiment of my invention:

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the exemplary embodiment of my invention illustrated in the drawings, 15 represents a closed base upon which the other parts of the machine are mounted. These machine parts consist generally of a tailstock 16, a headstock 17, a cutting mechanism 18, a relieving and free return mechanism 19 for reciprocating the lathe tool 20 laterally of the hob or work blank 21 during the cutting stroke and for separating the lathe tool and the work blank during the return stroke, and a control mechanism 22 for controlling the rotation of the work blank, the feeding reciprocation of the cutting tool longitudinally of the work blank, and the operation of the relieving and free return mechanism.

The machine constituting the preferred embodiment of my invention is adapted to form and relieve a hob having straight gashes and having a spiral thread. Briefly stated, the operation comprises rotating the work blank 21 at a predetermined speed in a given direction, reciprocating the cutting tool 20 laterally of the work blank once for each tooth to relieve the same, feeding the cutting tool in a cutting stroke longitudinally of the work blank and in timed relation to the rotation thereof to generate the thread, separating the cutting tool and the work blank laterally after the completion of the cutting stroke and reversing the direction of rotation of the work blank and the direction of feed of the cutting tool to return the cutting tool in a free return stroke to its initial position, and again reversing the rotation of the work blank and the feed of the cutting tool, and simultaneously releasing the cutting tool into cutting relation with the work blank for another cut.

The tailstock

Figure 1:
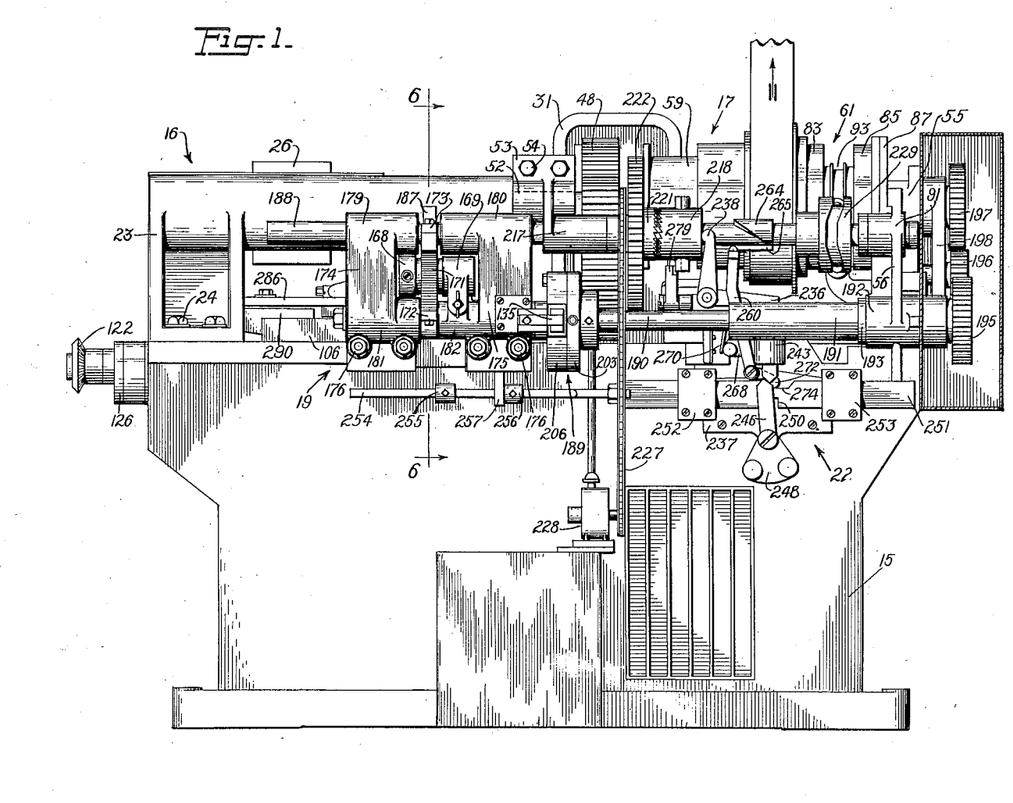
Figure 1 is a rear elevation of the machine.
Figures 2, 3:
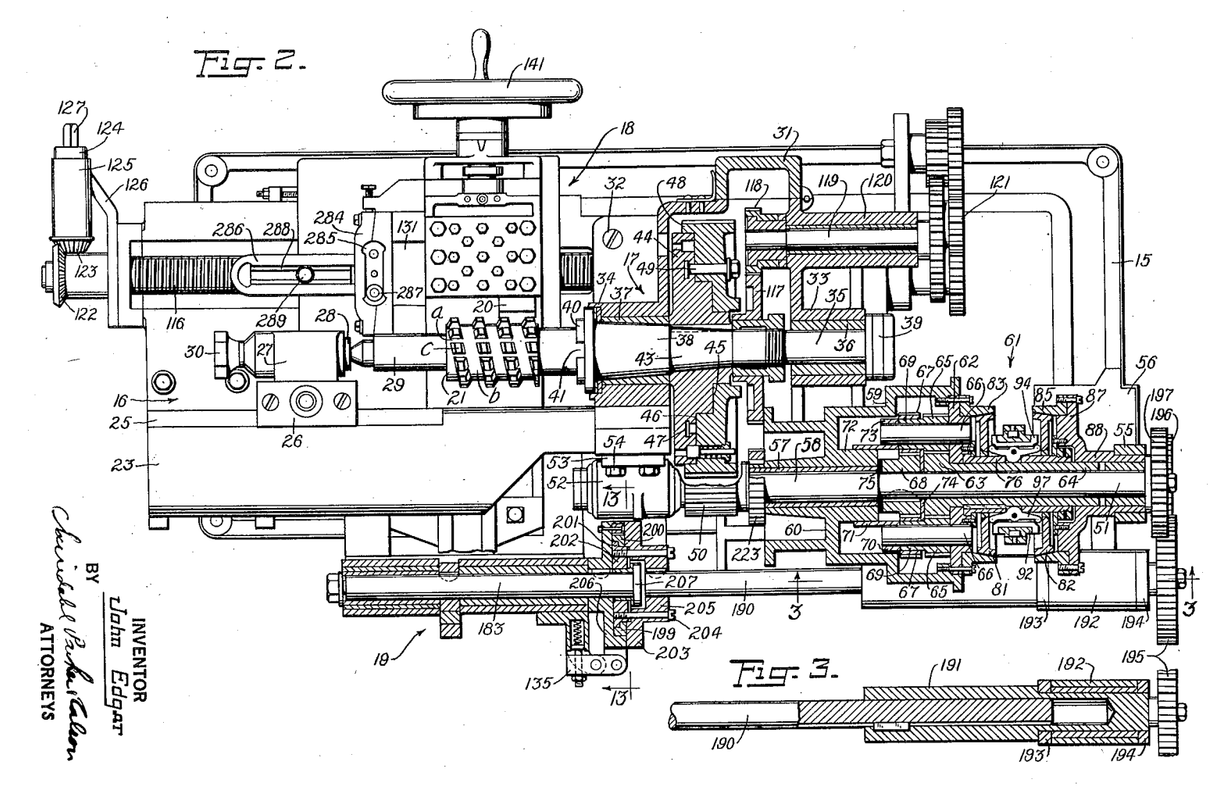
Fig. 2 is a plan view of the machine, certain parts being shown in horizontal section.
Fig. 3 is a fragmentary sectional view taken along line 3—3 of Fig. 2.
Figure 4:
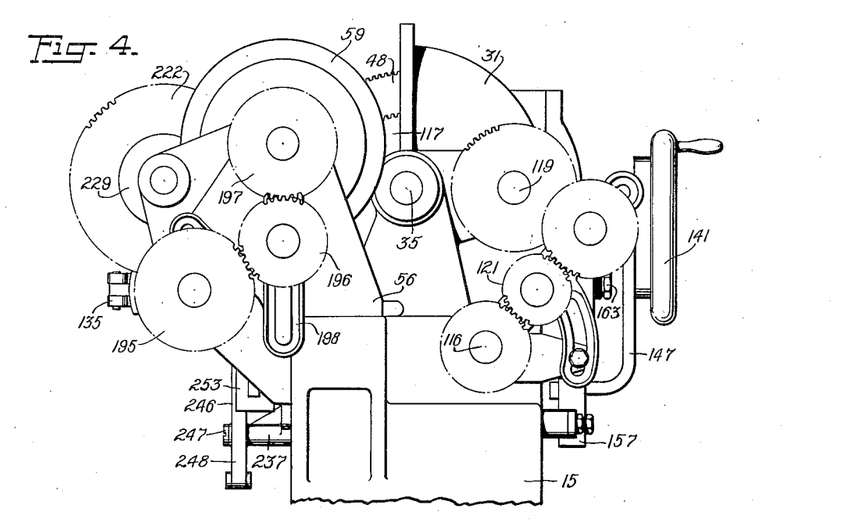
Fig. 4 is a left end view of the machine.

The tailstock 16 (see Figs. 1 and 2) comprises a bracket 23, which is secured to the base 15 by any suitable means, such as the bolts 24, and which extends longitudinally along one end of the rear edge thereof. The bracket 23 is formed on its front side with dovetailed guideways 25 on which is adjustably mounted a tailstock slide 26 having a center supporting sleeve 27. A center 28, adapted to receive one end of a work supporting mandrel 29, is adjustably mounted in the sleeve 27, and is adapted to be adjusted by means of an adjusting knob 30. In the present instance, the work blank 21 on the mandrel 29 is shown as a hob having straight gashes $a$ and a single thread $b$.

The headstock

The headstock 17 (see Figs. 1, 2, 9 and 14) comprises a housing or bracket 31 mounted on the base 15 opposite the tailstock 16, and secured in position by any suitable means, such as the bolts 32. The bracket 31 is formed with a pair of alined bearings 33 and 34 supporting a work spindle 35. Bushings 36 and 37 are provided, respectively, in the bearings 33 and 34, and the front bushing 37 is tapered to fit a taper 38 on the front end of the spindle 35. A pair of nuts 39 on the outer end of the spindle 35 next to the bearing 33 serve as means for holding the spindle in place, and for adjusting the spindle longitudinally in the bushing 37 to take up wear. At its front end, the spindle 35 is formed with a suitable drive connection for the mandrel 29, such as a slotted head 40 receiving an end key 41 on the mandrel.

Securely mounted on a tapered shoulder 43 on the spindle 35, between the bearings 33 and 34 and within the housing 31, is an index plate 44 formed on one side with a plurality of concentric shoulders 45 and 46, and with an annular T-slot 47. A large drive gear 48 is mounted for rotary adjustment on the shoulders 45 and 46, and is clamped securely to the index plate 44 by means of bolts 49 engaging the T-slot 47. Adjustment of the gear 48 on the index plate 44 is necessary to set the machine for cutting the different threads of a multiple thread hob.

For rotating the work blank, the gear 48 meshes with a small pinion 50 on a horizontal drive shaft 51. Of the drive shaft 51, one end is journaled in a suitable bearing 52 formed in a bearing bracket 53 which is secured by any suitable means, such as the bolts 54, to one end of the tailstock bracket 23, and the other end is journaled in a suitable bearing 55 in a bearing bracket 56 on the base 15.

Rotatably mounted on a sleeve 57 on an enlarged portion 58 of the drive shaft 51 is a hollow cone pulley 59 which is adapted to be driven by any suitable power means (not shown). The small end of the pulley 59 is closed by a web 60, and the large end constitutes a housing for a planetary transmission adapted to connect the pulley to the drive shaft 51 through a reversing clutch 61.

The planetary transmission comprises a plate 62 closing the large end of the pulley 59. A small gear 63 in the pulley 59 is rotatably mounted on the drive shaft 51, and is formed with an elongated hub 64 extending out of the pulley. The gear 63 meshes with two pinions 65 which are loosely rotatable on two diametrically opposed studs 66 extending inwardly from the plate 62. Rotatable respectively with the pinions 65 are two pinions 67 in mesh with opposite sides of a drive gear 68 keyed to the shaft 51. Preferably, the pinions 67 are fixed on hubs 69 on the pinions 65. To securely retain the double pinion members 65—67 on the studs 66, an annular retaining member 70 is provided having a sleeve 71 telescoping with a hub 72 formed on the web 60, and having ears 73 receiving the free ends of the studs. Bearing discs or rings 74 and 75 are interposed respectively between the gears 63 and 68, and between the gear 68 and the hub 72.

The clutch 61 (see Figs. 2, 9, and 14) comprises an elongated sleeve 76 keyed to the hub 64, and secured to the outer face of the plate 62 by any suitable means, such as a retaining ring 77. A pair of lock-nuts 78 are threaded into locking engagement with each other onto the free or outer end of the sleeve 76. A pair of diametrically opposed notches 79 are cut longitudinally into the sleeve 76 approximately midway of its ends. Slidably mounted on the sleeve 76 is a clutch sleeve 80. A pair of clutch cones 81 and 82 are secured respectively to opposite ends of the clutch sleeve 80. The clutch cone 81 is movable into and out of driving engagement with a clutch collar 83 which is rigidly secured to the cone pulley 59 and the plate 62 for rotation therewith, by any suitable means, such as the screw bolts 84. The clutch cone 82 is movable into and out of friction engagement with a clutch collar 85 which is similar to the collar 83, and which is rigidly secured by any suitable means, such as the bolts 86, to a circular plate 87 having a central hub 88 rigidly mounted in the bracket 56. The plate 87 is formed with a central space or chamber 89 in which the lock-nuts 78 are disposed. A retaining ring or flange 90 which is secured to the plate 87, projects in front of one of the lock-nuts 78 to aid in holding the sleeve 76 against axial movement. It will be evident that if the clutch cone 81 is moved into engagement with the collar 83, the gear 63 and the entire planetary transmission will be locked to the pulley 59 to rotate therewith at a high speed in one direction. It will further be evident that if the clutch cone 82 is moved into engagement with the collar 85, the gear 63 will be held stationary, and the pinions 65 and 67 will travel around the gear 63 with the pulley 59 to rotate the gear 68 and hence the shaft 51 at a slow speed in the opposite direction.

Slidably mounted on the clutch sleeve 80 is a yoke sleeve 92 formed with an outer peripheral clutch groove 93. The sleeve 92 is provided with a pair of U-shaped key numbers 94 which project respectively into diametrically opposed slots 95 cut longitudinally in the sleeve 80 between the clutch cones 81 and 82 and constituting keyways. The length of the slots 95 is greater than that of the key members 94 so as to permit longitudinal movement of the yoke sleeve 92. Pivotally mounted intermediate their ends on pivot pins 96 and within the slots 95 are two clutch fingers 97 having rounded ends 98. The ends of the key members 94 are cut away, as shown at 99, to provide cam surfaces for engaging the rounded ends 98. Rounded lugs 100 on the fingers 97 project into the notches 79 to key the sleeve 80 to the sleeve 76. A pair of arcuate shoes 101 respectively engage opposite sides of the groove 93 and are pivotally mounted on the spaced arms 102 and 103 of a clutch yoke 104. The latter is pivotally mounted for swinging movement on a hinge bracket 105 rigidly secured to the end bracket 56. By shifting the yoke sleeve 92, the fingers 97 will be pivoted into camming engagement with one of the clutch cones 81—82 to actuate the clutch.

The cutting mechanism

The cutting mechanism (see Figs. 2, 6 and 7) comprises a main carriage 106 mounted for reciprocation on longitudinal ways 107 and 108 on the upper side edges of the base 15. The front edge of the carriage 106 is formed with an inwardly inclined depending flange 109 engaging a plate 110 on the underside of the way 107. The rear edge of the carriage 106 is formed with a depending flange 111 secured on the way 108 by means of a gib plate 112. The carriage 106 is provided with a threaded lug 114 on its underside and freely disposed in a channel 115 formed in the upper surface of the base 15. An adjusting or feed screw 116 engages the lug 114, and, upon rotation in opposite directions, is adapted to feed the carriage in opposite directions longitudinally of the work blank 21.

Means is provided operatively connecting the feed screw 116 to the work spindle 35 so as to feed the carriage 106 in timed relation to the rotation of the work blank 21. This means comprises a gear 117 rigidly secured to the work spindle 35 within the housing 31, and meshing with a pinion 118 on a shaft 119. The latter is suitably journalled in a bearing 120 formed on the housing 31, and at its outer end is connected through suitable speed change gears 121 to the feed screw 116.

To provide means for feeding the carriage 106 manually, one end of the feed screw 116 is provided with a bevel gear 122 meshing with a bevel gear 123 on a shaft 124. The latter is journalled in a suitable bearing 125 formed on a bracket 126 secured to one end of the base 15, and is provided with a squared end 127.

Mounted in dovetailed guideways 128 on the carriage 106 for reciprocation laterally of the base 15 is a back-off or relieving slide 129. This slide is provided with transverse ways 130 supporting a side relief slide 131. A tool slide 132 is positioned for adjustment in transverse ways 133 on the slide 131, and is formed with a suitable recess 134 in which the cutting tool 20 of any desired form may be secured, as by means of bolts 136. In the present instance, the cutting tool 20 is shaped to form the contour of the hob thread.

The cutting tool 20 is adjustable toward and from the work blank 21 through an adjusting screw 137 having threaded engagement with the tool slide 132. The front end of the screw 137 is rotatably journalled in an upstanding lug 138 formed on the front edge of the side relief slide 131. To hold the screw 137 against longitudinal movement, a collar 139 is formed integral therewith, and is positioned to engage the rear side of the lug 138. A collar 140 is loosely mounted on the front end of the screw 137, and is clamped against the front side of the lug 138 by a hand wheel 141 secured on the screw by means of a nut 142. The collars 139 and 140 are adapted to be tightened against the lug 138 to apply a friction drag to the screw 137.

Figure 5:
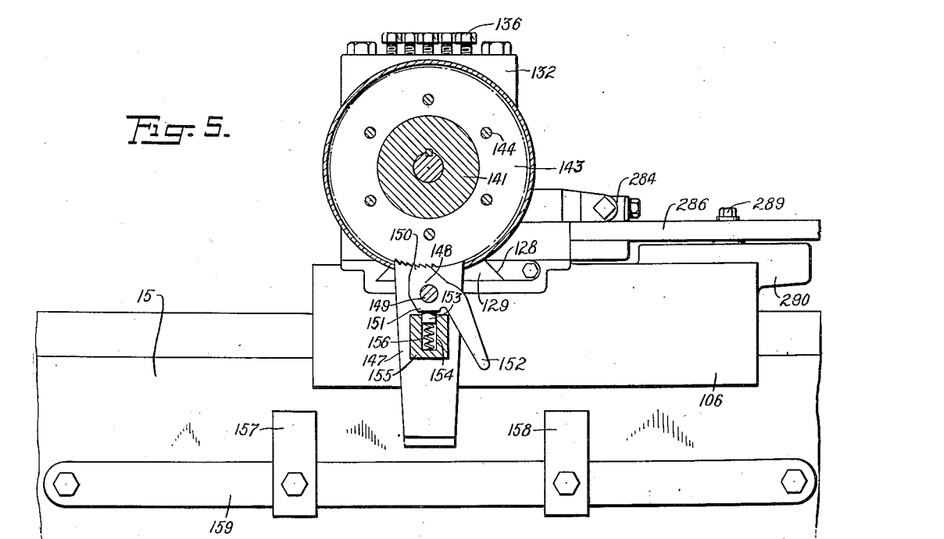
Fig. 5 is a view taken along line 5—5 of Fig. 6.

Means is provided for automatically feeding the cutting tool 20 incrementally into the work blank 21 at the beginning of each longitudinal cut. This means (see Figs. 5 and 6) comprises a ratchet 143 which is rigidly secured to the hand wheel 141 by any suitable means, such as the screw bolts 144, and which preferably is annular in shape and mounted in an annular notch 145. This notch is formed in the rear side of the hand wheel 141, and is concentric with respect to the screw 137. Rotatably mounted on a rearwardly extending hub 146 on the hand wheel 141 is a lever 147 which extends downwardly and then inwardly toward the base 15. A pawl 148 is pivotally mounted on a stud 149 threaded into the lever 147, and has teeth 150 positioned to engage the ratchet 143. The pawl 148 is also formed with a heel 151 on the same side of the stud 149 as the tooth 150, and with a trip arm 152 by means of which the pawl may be held manually out of engagement with the ratchet 143. To yieldingly hold the tooth 150 in engagement with the ratchet 143, a plunger 153 is slidably disposed in a bore 154 in a lug 155 in the lever 147 and is pressed against the heel 151 by a coil spring 156, also disposed in said bore. The lower end of the lever 147 is movably disposed between two reversing dogs 157 and 158 adjustably mounted in spaced relation on a horizontal bar 159 mounted on the front side of the base 15. It will be evident that as the carriage 106 moves to the left, as viewed in Fig. 5, the dog 157 will engage and oscillate the lever 147, thereby moving the tooth 150 over the ratchet 143 without rotating the latter, and that as the carriage moves to the right, the dog 158 will actuate the lever to rotate the ratchet through a predetermined arc, thereby effecting an incremental feed of the cutting tool 20 into or toward the hob blank 21.

*The relieving and free return mechanism*

Means is provided for reciprocating the lathe tool 20 laterally of the hob blank 21 and in timed relation to the rotation thereof so as to properly relieve the hob teeth c. This means (see Figs. 1, 2, 6 and 7) comprises a compression coil spring 160 tending to hold the cutting tool 20 out of engagement with the hob. The spring 160 is positioned in a bore 161 formed in the backing-off slide 129, and extending from the front edge thereof to a central vertical bore 162 also formed in the slide. The front end of the bore is closed by a threaded plug 163 which is held in adjusted position by a lock-nut 164, and which serves as an abutment for the front end of the spring. The inner end of the spring 160 is secured to a spring anchor 165 which is formed on a stud 166 rigidly secured to the carriage 106. It will be evident that the spring 160 tends to hold and to move the cutting tool 20 out of engagement with the hob blank, and that the spring pressure can be adjusted by adjusting the plug 163.

The rear end of the backing-off slide 129 is formed integral with a rearwardly and upwardly inclined extension 167 having a pair of spaced end bearings 168—169 in which a stub shaft 170 is supported. Pivotally mounted intermediate its ends on the stub shaft 170 is a cam lever 171. A pair of hardened cam followers 172—173 are removably secured respectively to the upper and lower ends of the cam lever 171.

Securely but adjustably mounted on the carriage 106 at opposite sides of the cam lever 171 are a pair of spaced uprights 174—175. In the present instance, these uprights are secured in position by means of bolts 176, the heads of which engage a T slot 177 formed in a bar 178 integral with the gib plate 112. The uprights 174—175 are formed respectively with upper alined bearings 179—180 and lower alined bearings 181—182. A lower cam shaft 183 is journalled in the lower alined bearings 181—182, and supports a rotary cam 184 adapted to coact with the cam follower 173. The cam 184 has a spiral working face 185 terminating abruptly at 186, and is adapted upon rotation in a clockwise direction as viewed in Figs 6 and 7 to oscillate the lever 171 about the point of cam follower 172 as a fulcrum to periodically give the cutting tool 20 a positive relieving movement toward the hob blank 21. The cam follower 172 coacts with a rotary cam 187 mounted on a shaft 188 rotatably and slidably disposed in the upper alined bearings 179—180. This cam 187 is stationary during rotation of the cam 184 so as to provide a fixed fulcrum for the lever 171.

The lower cam shaft 183 is connected through a ratchet mechanism 189 to a shaft 190 splined in a long bearing sleeve 191 rotatably mounted in a bearing 192 formed on the bracket 56. (See Fig. 3.) The sleeve 191 is held against longitudinal movement by a pair of spaced collars 193—194 engaging opposite ends of the bearing 192, and is connected to the main drive shaft 51 through a gear 195, an idler gear 196 and a gear 197. The idler gear 196 is adjustably mounted in a suitable bracket 198 supported on the bracket 56. It will be seen that the cam 184 is thus adapted to be driven in a clockwise direction in timed relation to the rotation of the hob blank 21.

Figure 6:
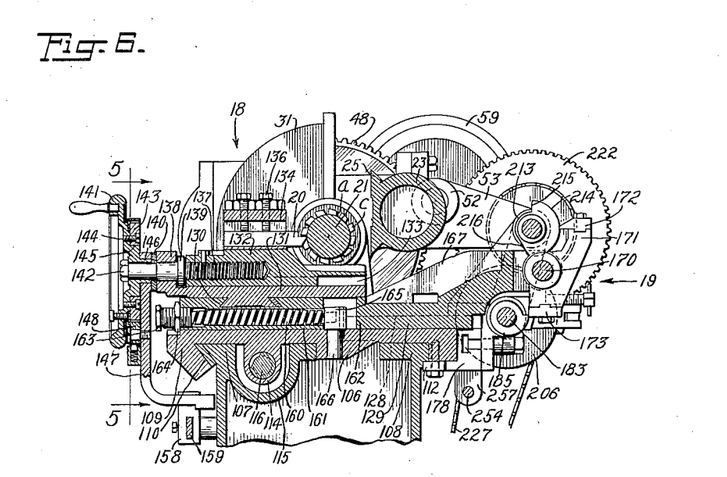
Fig. 6 is a sectional view of the tool carriage taken along line 6—6 of Fig. 1, the lathe tool being shown in its innermost position in the relieving stroke.
Figure 7:
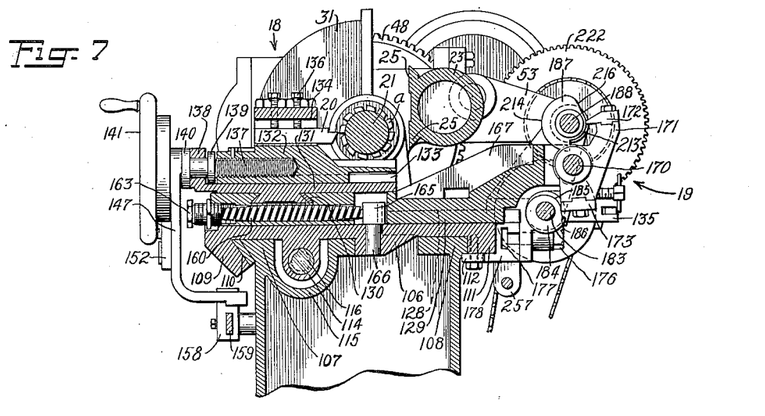
Fig. 7 is a view similar to Fig. 6, but showing the tool in withdrawn position.
Figures 8, 9, 10:
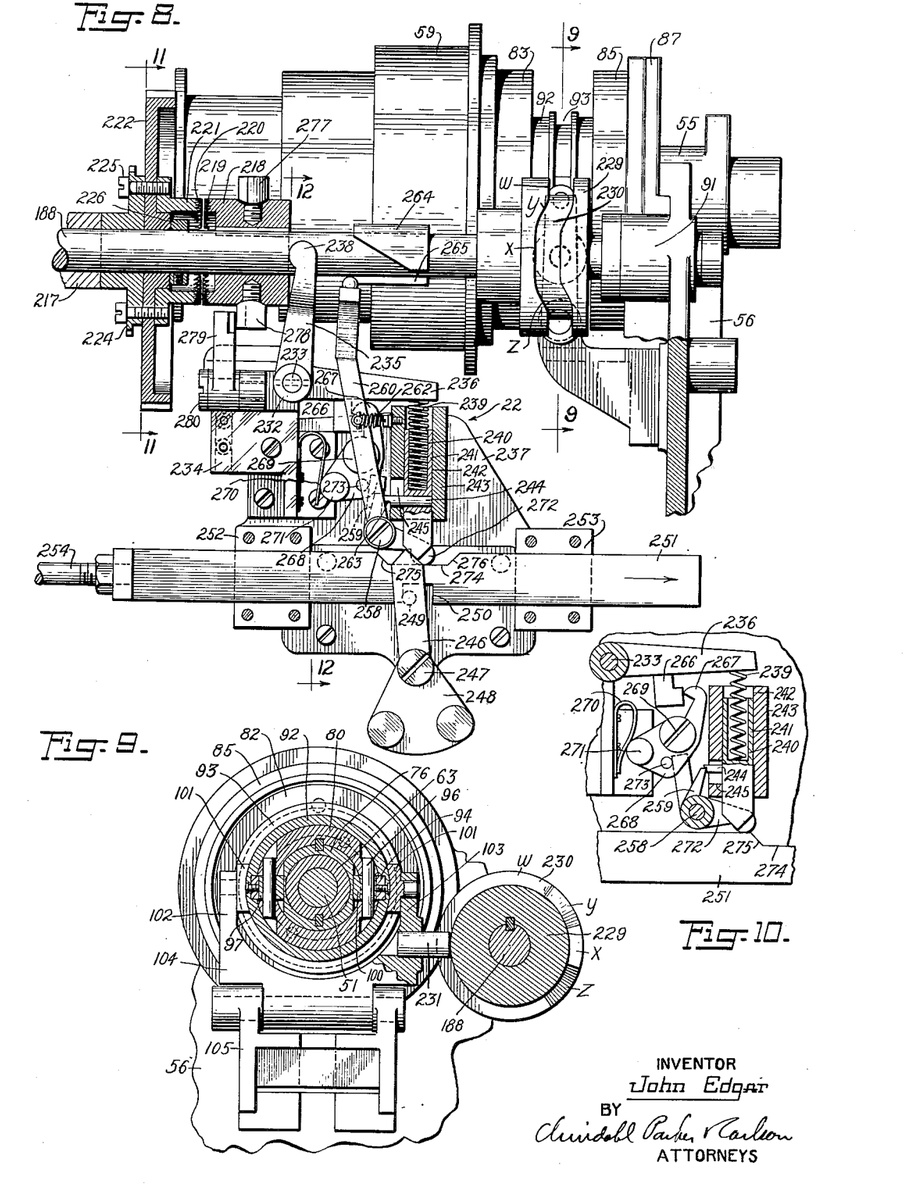
Fig. 8 is an enlarged view, partially in section and partially in elevation, of the means for controlling the movements of the form tool, and of the work blank.
Fig. 9 is a view taken along line 9—9 of Fig. 8.
Fig. 10 is a detail view of the trip mechanism in the control means.
Figures 11, 12, 13, 14:
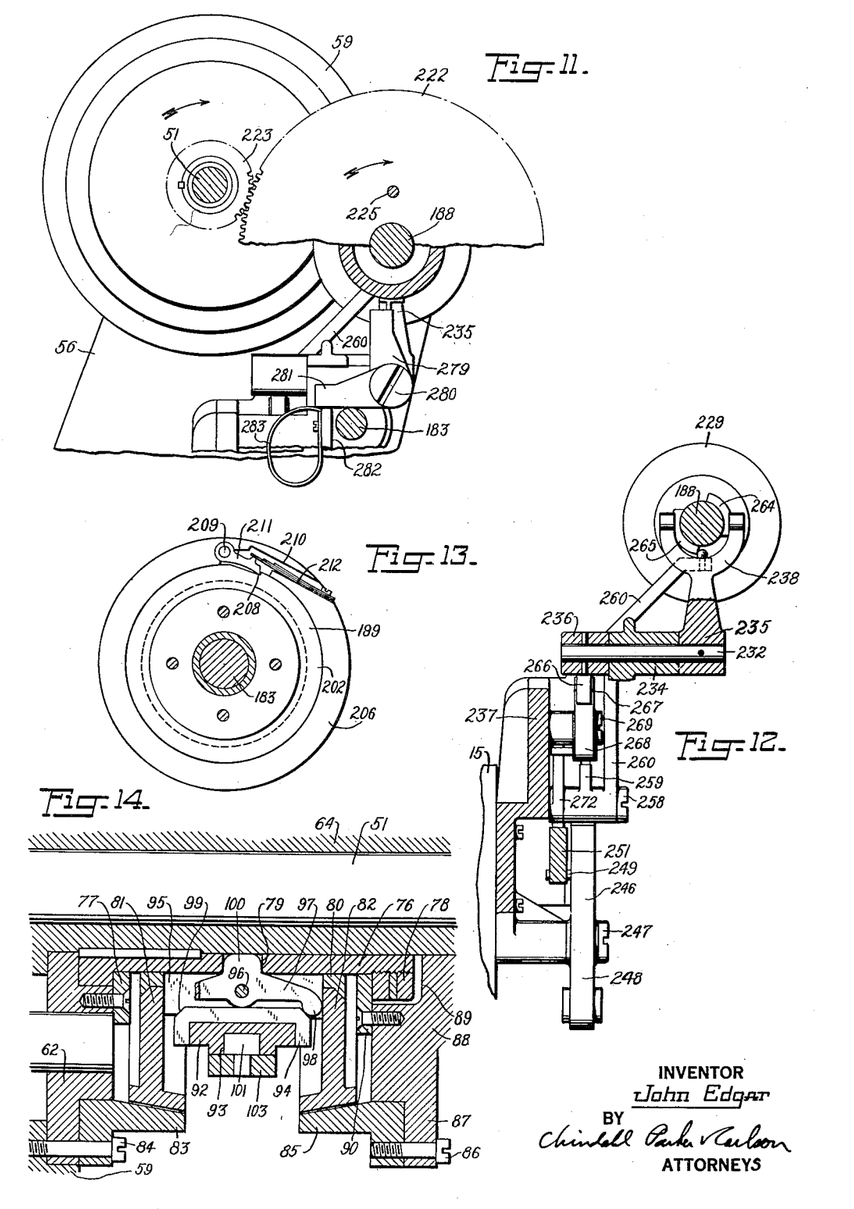
Fig. 11 is a sectional view taken along line 11—11 of Fig. 8.
Fig. 12 is a sectional view taken along line 12—12 of Fig. 8.
Fig. 13 is a sectional view taken along line 13—13 of Fig. 2.
Fig. 14 is an enlarged fragmentary longitudinal sectional view of the main clutch.

The ratchet mechanism 189 (see Figs. 1, 2 and 13) prevents rotation of the shaft 183, and hence the cam 184, in a counter-clockwise direction as viewed in Fig. 6. This mechanism comprises a ratchet 199 which is secured to the shaft 190 for rotation therewith. Preferably the ratchet 199 is in the form of a ring having an inner flange 200 over-lapping with an outer flange 201 on a central plate 202. The latter is secured to a plate 203 by means of a plurality of screw bolts 204. The plate 203 has a hollow hub 205 keyed to the shaft 190. It will be evident that the flange 200 is clamped securely between the flange 201 and the plate 203 to clamp the ratchet 199 tightly against the latter. The ratchet 199 is rotatably disposed within a hollow cylindrical housing 206 which is keyed to the shaft 183, and which is closed by the plate 203. The shaft 183 extends through the plate 202, and has an enlargement 207 disposed within the hub 205. While the ratchet 199 may be of any suitable form, preferably it is provided with a single tooth 208 cut in its periphery. Pivotally mounted on a pin 209 and in an opening 210 cut in the peripheral wall of the housing 206 is a pawl 211 which engages the tooth 208. A leaf spring 212 secured within the opening 210 to the housing 206 engages the movable end of the pawl to hold the latter yieldingly in engagement with the tooth 208. A suitable friction brake 135 yieldingly engages the periphery of the housing 206 to prevent looseness. It will be evident that the shaft 190 will be operative to turn the shaft 183 in a clockwise direction as viewed in Fig. 6, but will be ineffective to turn the shaft 183 in the counter-clockwise direction.

The cam 187 serves to position the slide 129 so as to hold the cutting tool 20 in operative relation to the work blank 21 during the cutting stroke and in inoperative relation thereto during the free return stroke. The cam 187 has an arcuate cam surface 213 of a relatively small radius, and an arcuate cam surface 214 of a relatively large radius. The rear end of the surface 214 terminates abruptly at 215, and the forward end is connected through an inclined surface 216 to the surface 213. Movement of the cam surface 214 into engagement with the cam follower 172 will oscillate the cam lever 171 about the cam follower 173 as a fulcrum, to move the slide 129 rearwardly against the force of the spring 160 to its operative position (see Fig. 6). Movement of the cam surface 213 into engagement with the cam follower 127 will permit the cam follower 172 to swing forwardly thereby permitting the spring 160 to move the slide 129 forwardly into its inoperative position. (See Fig. 7.) The cam 187 is moved periodically through 180°, and during its movement, and also during the free return stroke, the cam 184 is stationary.

The shaft 188 on which the cam 187 is secured is journalled in a bearing 217 formed on the bracket 53, and in a bearing 91 formed on the end bracket 56. Splined on the shaft 188 is a clutch element 218 (see Fig. 8) having teeth 219 adapted to be moved into and out of engagement with teeth 220 on a second clutch element 221. The clutch teeth are inclined in a direction to drive the shaft 188 in a clockwise direction as viewed from the left in Fig. 8. The clutch element 221 is fixed for rotation with a gear 222 rotatably mounted on the shaft 188 and meshing with a pinion 223 (see Fig. 2) on the cone pulley 59. Also secured to the gear 222 for rotation therewith, is a sprocket wheel 224. In the present instance, the clutch element 221, and the sprocket wheel 224 are clamped to opposite sides of the gear 222 by means of a plurality of bolts 225. A collar 226 is fixed to the shaft 188 within the clutch element 218, and next to the hub of the gear 222, and serves to hold the assembled parts against the bearing 217. The sprocket wheel 224 is operatively connected through a suitable chain 227 (see Fig. 1) to a pump 228 mounted on the rear of the base 15, and adapted to supply coolant to the cutting tool 20 and the work blank 21 during the cutting operation.

Rigidly mounted on the cam shaft 188 is a rotary cam 229 (see Figs. 8 and 9) having a peripheral cam groove 230 which engages a pin 231 on the clutch yoke 104. The cam groove 230 has two sections $w$ and $x$ which are respectively relatively long and short, and which are adapted to hold the clutch yoke 104 in opposed positions. The ends of the sections $w$ and $x$ are connected by inclined sections $y$ and $z$ which are adapted upon rotation of the shaft 188 to throw the yoke 104 in opposite directions. It will be evident that the clutch element 218 directly controls the clutch 61 and the operation of the cam 187, and through the clutch 61 indirectly controls the direction of rotation of the work blank 21, the direction of feed of the carriage 106, and the operation of the cam 184.

*The control mechanism*

Means is provided for automatically moving the clutch element 218 into operative engagement with the clutch element 221 at each end of the reciprocation of the carriage 106 to effect rotation of the cam shaft 188 through one-half of a revolution. This means (see Figs. 8, 10, 11 and 12) comprises a bell-crank lever 232 which is pivotally mounted at 233 on a bracket 234, and which has a vertical arm 235 and a horizontal arm 236. The bracket 234 is mounted on a bracket 237 on the rear wall of the base 15. The arm 235 is formed on its upper end with a fork 238 which straddles the shaft 188 and which engages the outer end of the clutch element 218. The outer end of the arm 236 rests on a coiled compression spring 239 which is disposed in a bore 240 in the upper end of a plunger 241. The latter is slidably mounted in the bore 242 of a vertical sleeve 243 formed on the bracket 237, and carries a pin 244 extending laterally therefrom through a longitudinal slot 245 in the side of the sleeve. The pin 244 serves to prevent rotary movement and to limit longitudinal movement of the plunger 241.

The lower end of the plunger 241 is pointed, and engages the pointed swinging end of a pendulum member 246 pivotally mounted at 247 on the bracket 237 and carrying a weight 248. A pin 249 on the pendulum member 246 projects laterally therefrom through a square notch 250 in the lower edge of a horizontal cam bar 251. This cam bar is slidably mounted in two spaced slideways 252—253 on the bracket 237, and is provided with an extension rod 254. Two spaced reversing dogs 255—256 (see Fig. 1) are adjustably mounted on the rod 254, and are positioned at opposite sides of an arm 257 depending from the carriage 106. Movement of the carriage 106 into either end position will bring the arm 257 against one of the dogs 255—256 to shift the bar 251, and thereby oscillate the pendulum member 246 over center position. This will cam the plunger 241 upwardly to compress the spring 239.

Pivotally mounted on a stud 258 on the bracket 237 is a latch arm 259. A lever 260 is rigid with the arm 259 for oscillation therewith about the stud 258, and is connected by a coil spring 262 to the sleeve 243. The arm 259, under the influence of the spring 262, is adapted to move into engagement with a notch 263 in the lower outer edge of the pin 244 when the plunger 241 is raised to hold the latter in such position. The lever 260 extends upwardly, and the upper end thereof, when the latch 259 engages the notch 263, projects into the path of either of two circumferentially spaced cams 264—265 on the shaft 188. When the shaft 188 is rotated, one of the cams 264—265 will swing the lever 260 to the left (as viewed in Fig. 8), to release the plunger 241.

Means is provided for holding the arm 236 in lowered position so as to compress the spring 239 when the plunger 241 is raised. This means comprises a hook 266 formed integral with and depending from the arm 236. The hook 266 when the arm 236 is lowered is adapted to be caught by a latch 267 which is formed on a latch member 268 pivoted to the bracket 237 at 269. A bent spring 270 on the bracket 234 engages a boss 271 on the latch member 268, and therethrough tends to move the latch 267 into engagement with the hook 266.

Means is provided for releasing the arm 236 when the spring 239 is compressed so as to permit the latter to move the clutch element 218 forcefully into engagement with the clutch element 221. This means comprises a bell-crank lever 272 pivotally mounted on the stud 258. Of the lever 272, one arm extends upwardly across a pin 273 on the latch member 268 and is adapted upon oscillation to the left to oscillate the latch member against the force of the spring 270 so as to release the arm 236, and the other arm is inclined downwardly and engages the upper edge of the bar 251. A notch 274 having inclined end faces 275—276 is cut in the upper edge of the bar 251. Upon movement of the bar 251, the lower arm of the lever 272 is adapted to ride out of the notch 274 over either of the faces 275—276 to disengage the hook 266 and the latch 267 after the pendulum point 246 has been moved past dead center, and upon reversal of movement of the bar 251 is adapted to reenter the notch 274 before the pendulum point 246 is moved across the point of the plunger 241 in the opposite direction so as to permit reengagement between the hook 266 and the latch 267 after the arm 236 is lowered.

To effect a positive separation of the clutch elements 218—221 when the shaft 188 has been turned through the desired extent, i. e. 180°, the clutch element 218 is provided with a pair of diametrically opposed cam pins 277—278 which project radially therefrom. A cam arm 279, mounted on a stud 280 on the bracket 234, projects into the path of the cam pins 277—278, and is adapted to cam the clutch element 218 out of engagement with the clutch element 221. The arm 279 is held in position by an arm 281 rigid therewith and extending at right angles thereto. The arm 281 rests on the horizontal edge of a plate 282 on the bracket 234 to hold the arm 279 positively against inward movement, and is held against said edge by a bent spring 283 on said plate to yieldingly hold the arm 279 against outward movement.

*Side relief mechanism*

Means is provided whereby the side relief slide 131 may be given an automatic reciprocation for each relieving movement of the slide 129 so as to generate an oblique relief instead of a rectangular relief when desired. This means (see Figs. 2 and 5) comprises a bracket 284 secured to the end of the slide 131 and defining a lateral slot or guideway 285. A lever 286 is pivoted at one end in the bracket 284 and carries a roller 287 at one side of its pivot engaging the guideway 285. The lever 286 is formed with a longitudinal guideway 288 which is engaged by a stud 289 adapted to be adjustably mounted in a block 290 on the carriage 106. When the stud 289 is clamped in position on the block 290, reciprocation of the slide 129 pivots the lever 286 about a fixed pivot, thereby causing the roller 287 to reciprocate the slide 131.

*Operation*

The operation will now be described. The cone pulley 59 is driven continuously in the direction of the arrows in Figs. 1 and 11.

At the beginning of the cutting stroke, the cutting tool 20 is positioned to engage one end of the rear face of one of the grooves *a* of the work blank 21 in a horizontal plane through its axis. The cam face 214 engages the follower 172 to hold the cutting tool in its operative position. The clutch cone 82 is in engagement with the clutch collar 85 so as to drive the spindle 35 at a low speed and in the same direction as the pulley 59 and to feed the carriage 106 along the base 15 in timed relation to the rotation of the blank 21 to generate the desired thread *b*. The cam 184 is rotated in timed relation to the rotation of the work blank 21 so as to give the cutting tool 20 a relieving movement toward the blank once for each tooth *c*.

When the carriage 106 nears the end of its cutting stroke, the arm 147 is oscillated by the dog 157 without rotating the ratchet 143, and the arm 257 engages the dog 256 to move the bar 251 to the right. In the initial movement of the bar, the lever 272 moves over the face 276 into the notch 274 to release the latch member 268. Upon further movement of the bar 251, the notch 250 engages the pin 249 to swing the point 246 across the end of the plunger 241, thereby raising the latter to compress the spring 239 against the arm 236 which is held against upward movement by the latch 267. When the plunger 241 is raised sufficiently, the spring 262 moves the latch 259 into engagement with the pin 244 to hold the plunger in raised position. Upon still further movement of the bar 251 to the right, the lower arm of the lever 272 rides out of the notch 274 over the cam face 275, thereby causing the latch 267 to release the arm 236. The compressed spring 239 moves the arm 236 upwardly with considerable force to connect the clutch elements 218 and 221. As a result the shaft 188 is driven in a clockwise direction as viewed in Fig. 11.

In the rotation of the shaft 188, the cam 264 engages the arm 260 to move the latch 259 out of engagement with the pin 244 so as to release the plunger 241, the cam 187 is rotated through one-half of a revolution to withdraw the cutting tool 20 from the work blank, and the cam 229 reverses the clutch 61 to return the cutting tool 20 to its initial position at a high rate of speed. Immediately after the reversal of the clutch 61, the arm 279 disengages the clutch elements 218 and 221 thereby lowering the arm 236. At this time, the latch 267 is inoperative to engage the hook 266. During the free return stroke of the carriage 106, the cam 184 is stationary.

As the carriage 106 approaches the end of its free return stroke, the arm 147 contacts with the dog 158 to effect an automatic incremental feed of the cutting tool 20 toward the work blank, and the arm 257 engages the dog 255 to move the bar 251 to the left. In this movement of the bar 251, the foregoing operation of the control means 22 is repeated. As a result, the cam 187 is oscillated through one-half of a revolution to return the cutting tool 20 to operative position, and the clutch 61 is reversed to start the next cutting stroke. The foregoing cycle of operations is repeated until the thread *b* of the blank 21 has been cut to the desired depth.

It will be evident that I have provided a novel machine and method whereby hob blanks can be threaded and relieved in a single machine operation.

I claim as my invention:

1. A machine for forming and relieving a work blank having generally longitudinal gashes and a spiral thread comprising, in combination, a power element, a main drive shaft, a reversible clutch for connecting said power element to said shaft, a work spindle for supporting the blank, means connecting said shaft to said spindle for rotating the blank, a cutting tool having a predetermined contour adapted to cut the desired tooth shape, means operatively connected to said main drive shaft for feeding said cutting tool along said work blank to generate the desired thread groove, means controlled by the feeding movement of said cutting tool for automatically reversing said clutch to reverse the rotation of the blank and the feed of said tool at predetermined points in said feeding movement, means for reciprocating said tool laterally of the blank and in timed relation to the rotation thereof to relieve each tooth of the thread during one stroke of the feeding movement, and means controlled by said feeding movement for separating the blank and said tool during the other stroke of said feeding movement.

2. A machine for forming and relieving rotary cutters having generally longitudinal gashes, comprising, in combination, means for rotating the cutter blank, a cutting tool, means for effecting a relative feeding reciprocation between the blank and said tool longitudinally of the blank and in timed relation to the rotation of the blank, means automatically operable during one stroke of each feeding reciprocation to hold the blank and said tool out of cutting engagement, means for effecting a relative reciprocation between the blank and said tool laterally of the blank and in timed relation to the rotation thereof during the cutting stroke of each feeding reciprocation so as to provide relief for each of the cutting edges being formed on the blank, and means for automatically effecting a relative reciprocation between the blank and said tool longitudinally of the blank and in timed relation to the lateral relieving reciprocation to provide an oblique relief.

3. A machine for cutting rotary cutters having generally longitudinal gashes, comprising, in combination, a main drive shaft, a reversing clutch for driving said shaft, means connected to said shaft for rotating the cutter blank, a cutting tool, means operatively connected to said shaft for effecting a relative feeding movement between the blank and said tool longitudinally of the blank and in timed relation to the rotation thereof, means controlled by said feeding movement for reversing said clutch to reverse said feeding movement at predetermined points, means controlled by said last mentioned means for separating the blank and said tool during one stroke of each feeding reciprocation, a rotary cam for relatively reciprocating said tool and the blank laterally of the blank and in timed relation to the rotation thereof, and means including a ratchet mechanism connecting said cam to said main drive shaft, said ratchet mechanism causing said cam to rotate during the cutting stroke of each feeding reciprocation and to be idle during the free return stroke of each feeding reciprocation.

4. A machine for cutting rotary work blanks comprising, in combination, means for rotating the blank, a cutting tool, means for effecting a relative feeding reciprocation comprising a continuous cutting stroke and a continuous free return stroke between the blank and said tool longitudinally of the blank and in timed relation to the rotation thereof, and means for effecting a relative reciprocation between the blank and said tool laterally of the blank and in timed relation to the rotation thereof during each cutting stroke, said last mentioned means being inoperative during each free return stroke.

5. In a device of the character described, in combination, a continually rotating member, a reciprocable member, means including a reversing clutch connected to said continually rotating member for driving said reciprocable member, a shaft, a clutch actuating member on said shaft for reversing said clutch, a clutch for connecting said continually rotating member to said shaft, clutch operating means for closing said last mentioned clutch, a cam bar adapted periodically to be reciprocated by said reciprocable member, a spring for actuating said clutch operating means, trip means for holding said clutch operating means inoperative against the pressure of said spring, means operable by said cam bar to compress said spring, and means operable by said cam bar to release said trip means.

6. In a device of the character described, in combination, a continually rotating member, a reciprocable member, means including a reversing clutch connected to said continually rotating member for driving said reciprocable member, a shaft, a clutch actuating member on said shaft for reversing said clutch, a clutch for connecting said continually rotating member to said shaft, a trip mechanism for closing said last mentioned clutch, and a cam bar adapted periodically to be reciprocated by said reciprocable member to set and release said trip mechanism to actuate said last mentioned clutch.

7. A machine of the character described having, in combination, a base, means on said base for supporting a work blank, a carriage slidably mounted on said base for movement longitudinally of said base, a slide carrying a cutting tool and mounted on said carriage for movement laterally of said base, a power element, means for rotating the blank and for feeding said carriage, a reversing clutch for connecting said last mentioned means to said element, a separating cam mounted on said carriage and controlling the working position of said slide, a shaft on which said cam is mounted, a cam on said shaft for actuating said clutch, a clutch for connecting said element to said shaft, a trip mechanism operable through movement of said carriage periodically to actuate said last mentioned clutch, and means for releasing last mentioned clutch after rotation of said shaft through a predetermined arc.

8. A machine of the character described having, in combination, a base, means on said base for supporting a work blank, a carriage slidably mounted on said base for movement longitudinally of the blank, a slide mounted on said carriage for movement laterally of the blank, a cutting tool on said slide, a power element, means for rotating the blank and for feeding said carriage, a reversing clutch for connecting said last mentioned means to said element, a separating cam mounted on said carriage and controlling the working position of said slide, a cam for reversing said clutch, means including a clutch for operatively connecting said cams to said element, and means operable through movement of said carriage periodically to close and open said last mentioned clutch.

9. A machine of the character described having, in combination, a base, means on said base for supporting a work blank, a carriage slidably mounted on said base for movement longitudinally of the blank, a slide carrying a cutting tool and mounted on said carriage for movement laterally of the blank, a power element, means including said element for reciprocating said carriage, a separating cam mounted on said carriage and controlling the working position of said slide, means including a clutch for operatively connecting said cam to said element, and means operable through movement of said carriage periodically to close and open said clutch so as to adjust said cam into position to separate the blank and said tool during one stroke of each carriage reciprocation.

10. In a device of the character described, in combination, a continually rotating member, a reciprocable member, means including a reversing clutch connected to said continually rotating member for driving said reciprocable member, a shaft, a clutch actuating member on said shaft for reversing said clutch, a clutch for connecting said continually rotating member to said shaft, a trip mechanism for closing said last mentioned clutch, a member adapted periodically to be actuated by said reciprocable member to set and release said trip mechanism, and means for opening said last mentioned clutch after a predetermined movement of said clutch actuating member.

11. A machine for cutting rotary cutters comprising, in combination, a base, means on said base for supporting the cutter blank, a carriage slidably mounted on said base longitudinally of the blank, a slide mounted on said carriage for movement laterally of said blank, a cutting tool mounted on said slide, a cam lever pivotally mounted in said slide, a pair of rotary cams mounted in said carriage and engaging opposite ends of said lever, spring means tending to hold said lever against said cams, driving means including a reversing clutch for rotating the cutter blank and moving said carriage, means controlled by the movement of said carriage for periodically reversing said clutch to reverse the movement of said carriage, and for periodically rotating one of said cams through a predetermined arc to adjust the position of said slide on said carriage during movement of said carriage in one direction, and means operable during movement of said carriage in the other direction to rotate the other of said cams in timed relation to the rotation of the blank.

12. A method of forming and relieving rotary cutters having generally longitudinal gashes and a spiral thread comprising rotating the work blank, reciprocating the cutting tool longitudinally of the blank in a continuous cutting stroke and in timed relation to the rotation thereof to generate the thread, reciprocating the cutting tool laterally of the blank in timed relation to the rotation thereof to relieve each tooth of the thread during the cutting stroke, laterally separating the blank and the tool at the end of the cutting stroke, reversing the direction of rotation of the blank and the direction of feed of the cutting tool to return the cutting tool in a free return stroke to its initial position, and reversing the direction of rotation of the blank and the feed of the cutting tool, and simultaneously returning the cutting tool into operative position for another cut at the end of the free return stroke.

13. In a device of the character described in combination, a continually rotating member, a reciprocable member, means including a reversing clutch connected to said continually rotating member for driving said reciprocable member, a shaft, a clutch actuating member on said shaft for reversing said clutch, a clutch for connecting said continually rotating member to said shaft, a trip mechanism for closing said last mentioned clutch, and means operable in timed relation to the movement of said reciprocable member for periodically setting and releasing said trip mechanism to actuate said last mentioned clutch.

In testimony whereof, I have hereunto affixed my signature.

JOHN EDGAR.